United States Patent Office 3,803,159
Patented Apr. 9, 1974

3,803,159
FLUORINE CONTAINING CYANOPYRIDINES
Florence E. Torba, Clayton, Calif., assignor to The Dow Chemical Company, Midland, Mich.
No Drawing. Original application Dec. 26, 1967, Ser. No. 693,105, now Patent No. 3,629,424, dated Dec. 21, 1971. Divided and this application Mar. 5, 1971, Ser. No. 121,561
Int. Cl. C07d 31/46
U.S. Cl. 260—294.9       5 Claims

ABSTRACT OF THE DISCLOSURE

The present invention is directed to new and novel cyanofluoropyridine compounds and to methods employing and compositions containing those compounds as pesticidal constituents. Represetative new compounds are 3,5-dichloro-4,6-difluoropicolinonitrile and tetrafluoropicolinonitrile, these and other compounds of the invention being particularly well adapted to be used as soil fumigants for the control of soil-infecting fungi.

CROSS REFERENCE TO RELATED APPLICATION

This application is a division of my co-pending application Ser. No. 693,105, filed Dec. 26, 1967, now U.S. Pat. 3,629,424, issued Dec. 21, 1971.

BACKGROUND OF THE INVENTION

The cyanofluoropyridine compounds of this invention are related to the cyanotetrachloropyridine compounds tetrachloropicolinonitrile, tetrachloronicotinonitrile and tetrachloroisonicotinonitrile, and are preferably prepared therefrom by reaction with potassium fluoride. These tetrachloro starting compounds are taught in the art and are known to be relatively stable, non-volatile chemicals which have appreciable activity against soil-dwelling fungi. However, the cost of treating soil therewith is relatively high since not only are relatively large dosages of these chemicals required for effective fungi control, but also the cost of introducing the same into the soil with the requisite degree of uniformity is undesirably large. Thus, the compounds are capable of performing the desired fungicidal function only when carefully worked into the seed bed so as to insure that each soil particle bears an effective amount of the toxicant.

The present invention rests in part on the discovery of novel cyanofluoropyridine compounds disclosed herein, which have utility for a variety of pesticidal applications. It also rests on the discovery that these novel compounds have higher than expected activity against soil fungi even when present in the soil in unusually small amounts, and that, moreover, this result is obtained when the uniformity of mixture thereof with the soil is substantially less complete than is required by the corresponding tetrachloro starting materials.

SUMMARY OF THE INVENTION

The new and novel compounds of the present invention are cyanofluoropyridines having the structure

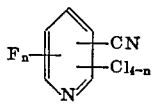

wherein $n$ is an integer having a value of 1 to 4, inclusive. Those compounds wherein the cyano group is in the 2-position of the ring are termed picolinonitriles, while those with the cyano group in the 3- or 4-positions are termed nicotinonitriles and isonicotinonitriles, respectively. However, these various groups of compounds will be generically referred to herein as cyanofluoropyridines, a term which includes those compounds which are substituted only by fluorine atoms, as well as those which are substituted by both fluorine and chlorine atoms.

The following compounds are representative of those which fall within the scope of the present invention:

tetrafluoropicolinonitrile,
3-chloro-4,5,6-trifluoropicolinonitrile,
5-chloro-3,4,6-trifluoropicolinonitrile,
6-chloro-3,4,5-trifluoropicolinonitrile,
3,5-dichloro-4,6-difluoropicolinonitrile,
3,5,6-trichloro-4-fluoropicolinonitrile,
3,4,5-trichloro-6-fluoropicolinonitrile,
3,4,6-trichloro-5-fluoropicolinonitrile,
tetrafluoronicotinonitrile,
5-chloro-2,4,6-trifluoronicotinonitrile,
5,6-dichloro-2,4-difluoronicotinonitrile,
2,5,6-trichloro-4-fluoronicotinonitrile,
4,5,6-trichloro-2-fluoronicotinonitrile,
2,4,5-trichloro-6-fluoronicotinonitrile,
tetrafluoroisonicotinonitrile,
3-chloro-2,5,6-trifluoroisonicotinonitrile,
3,5-dichloro-2,6-difluoroisonicotinonitrile,
2,3-dichloro-5,6-difluoroisonicotinonitrile,
2,3,5-trichloro-6-fluoroisonicotinonitrile, and
2,3,6-trichloro-5-fluoroisonicotinonitrile.

The cyanofluoropyridine compounds of this invention are white crystalline or waxy materials or colorless liquids. They are slightly soluble in water and are highly soluble in many organic solvents such as acetone, benzene, xylene, toluene, dimethylformamide, ethanol and isopropanol. It is an advantage of the present invention that the compounds thereof have vapor pressures which are substantially higher than those of the corresponding cyanotetrachloropyridines, a quality which, coupled with an unexpectedly high level of pesticidal activity, makes them particularly well adapted to be employed as soil fumigants. Thus, it has been found that the herein described cyanofluoropyridines effectively permeate the soil for varying distances from their point or localized zone of application, whereas no such permeation accompanies treating with the cyanotetrachloropyridine compounds. It is a further advantage that the compounds hereof, while sufficiently active and persistant to accomplish the desired pesticidal action when added in pesticidally effective amounts, nevertheless dissipate within a reasonable length of time and thus do not interfere with good field management practices. The compounds of this invention are also useful for application to seeds to protect the latter against fungal attack in the soil, they being used either alone or in conjunction with other seed protectants such as the various mercurial fungicides. They are also useful in the control of bacterial pests, many of the compounds hereof being effective against *Staphylococcus aureus*, for example. Said compounds also have nematocidal activity.

The cyanofluoropyridine compounds of the present invention can all be prepared by heating the appropriate 2-, 3- or 4-cyanotetrachloropyridine compound with potassium fluoride to obtain the desired cyanofluoropyridine compound along with potassium chloride as a by-product. The preparation of these cyanotetrachloropyridine starting materials, along with their characteristics, is taught in U.S. Pat. No. 3,325,503 and involves reacting chlorine with cyano-substituted pyridines in any one of a variety of methods. One mole of potassium fluoride is consumed for each fluorine atom which is introduced into the cyanopyridine compound by replacement of a chlorine atom. While the proportions in which the reactants are employed is not critical, the reaction is preferably conducted using an excess of potassium fluoride over the stoichiometric amount theoretically required to form the desired mono-, di-, tri- or tetrafluoropyridine product. Good results have been had with an excess of potassium fluoride of at least 100 mole percent. The reaction conditions to be employed are not critical. It has been found that the desired halogen exchange reaction takes place over a wide range of temperatures and at elevated, reduced or ambient pressures. Thus, good results have been obtained with temperatures ranging from about 40° C. to at least about 450° C. Ambient pressures have been employed with good results, as have the somewhat super-atmospheric pressures induced as the reactants are heated to relatively higher temperatures in a sealed pressure vessel. Reaction times vary from ½ hour to periods extending over 20 hours or more. The reaction proceeds in either the presence or the absence of an organic solvent which is inert under the reaction conditions employed. Representative inert organic solvents which may be used for this purpose include acetonitrile, dimethylsulfoxide, dimethylformamide, N-methyl-2-pyrrolidone, sulfolane and dimethylsulfone. A solvent of this type is employed in those reactions which are conducted below about 138°–150° C. (the melting point range of the several 2-, 3- and 4-cyanotetrachloropyridine starting materials) so as to ensure the presence of a reaction mixture which is at least partially liquid. The solvent may also be employed in preparations conducted at higher temperatures. The fluoro-substitution reaction progresses with time, and the build up of cyanofluoropyridine products in the reaction mixture can be followed by vapor phase chromatography or other convenient analytical method as the reaction progresses.

Each of the product compounds formed during the reaction can be separated and obtained in any desired degree of purity by the practice of conventional procedures known to those skilled in the art. Included, for example, are such methods as filtration, fractional distillation, fractional crystallization, solvent extraction and the like. Moreover, the product compounds can all be identified by a practice of known analytical methods and procedures. Among those employed for this purpose are vapor phase chromatography, nuclear magnetic resonance, infra red spectrum, elemental analysis and mass spectrography.

In carrying out the method of this invention, the undesirable fungi can be controlled by contacting the fungal organisms and/or their habitat with a fungicidal amount of the cyanofluoropyridine. When employed in the treatment of soil, such practice conrols the soil dwelling fungi which attack the underground portions of plants such as roots and tubers. Thus, the new practice improves the emergence and growth of seedlings and the crop harvest.

The distribution of at least a minimum effective dosage of the cyanofluoropyridine compounds in soil is critical and essential to a practice of the soil treating method of the present invention. In determining an effective dosage of the soil treating compounds, at least a fungicidal amount of the desired toxicant should be employed. In general, good controls of fungi are obtained when the compounds are distributed in the soil in the amount of from about 0.1 to 50 parts or more by weight per million parts by weight of soil. However, the effective amount of the compound to be employed will vary somewhat according to the particular compound and the nature and condition of the soil to be treated.

In field applications, the cyanofluoropyridine compounds may be distributed in the soil by broadcast methods wherein the entire field is treated, or in row applications wherein only the row area to be planted is treated. In broadcast methods, the compounds can be distributed at a dosage of 1 ounce to 400 pounds per acre. Such dosages are conventionally employed through a crosssection of the soil so as to provide for the presence therein of an effective concentration of the treating agent to a depth of at least 2 inches. On the other hand, for some applications the treated depth may well be 25 inches or more. In other applications, the cyanofluoropyridine compounds can be distributed in the rows where the crop is to be planted. In such row treatment the cyanofluoropyridine compounds can be employed at a rate of from about 0.1 ounce to about 40 pounds per acre. In field application any of the conventional methods such as drenching, drilling, row placement, etc. may be used to distribute the chemical in the soil at a dosage of 0.1 to 50 parts for each million parts by weight of the soil actually treated to produce effective control of fungal and certain bacterial soil pests. This does not, however, limit the application method to those conventionally practiced.

The method of the present invention may be carried out by distributing the unmodified cyanofluoropyridine compound in growth media as by impregnating or fumigating the soil. However, the present method also embraces the employment of liquid or dust compositions containing the toxicant to effect such impregnation or fumigation. In such usage, the toxicant compounds hereof may be modified with one or a plurality of additaments or soil treating adjuvants including water, organic solvents, petroleum oils, distillates or naphthas or other liquid carriers, polymeric thickening agents, urea, surface-active dispersing agents and finely divided inert solids. They also can be employed in compositions containing other pesticides, more especially fungicides, nematocides or insecticides or the like. Depending upon the concentration of the toxicant, such augmented compositions are adapted to be distributed in soil or to be employed as concentrates and subsequently diluted with additional inert carrier to produce the ultimate treating compositions. In compositions where the adjuvant is a finely divided solid, a surface active agent or the combination of a surface active agent and a liquid additament, the adjuvant cooperates with the active component so as to facilitate the invention and obtain an improved and outstanding result.

The exact concentration of the cyanofluoropyridine compounds to be empolyed in the treating composition is not critical and may vary considerably provided the required effective dosage of toxicant is supplied in the growth medium. The concentration of toxicant in organic solvent compositions employed to supply the desired dosage generally is from about 10 to 85 percent by weight. With aqueous compositions, the required dosage is generally supplied with compositions containing from 0.2 to 50 percent by weight, although concentrations of 0.0001 percent by weight conveniently may be employed in irrigation treatments of soil. In dusts, the concentration of toxicant may be from about 1 to 50 percent by weight, although concentrations as low as 0.1 percent by weight are sometimes employed. In compositions to be employed as concentrates, the toxicants may be present in a concentration of from 5 to 95 percent by weight.

The quantity of treating composition to be applied may vary considerably provided that the required dosage of active ingredient is applied to facilitate the penetration and distribution of said ingredient in growth media. The required amount of the active ingredient in the soil per acre treated may conveniently be supplied in from 1 pint to 20 gallons or more of the liquid carrier as dispersed in 6 or more acre inches of irrigation water, or in from 50 to 2,000 pounds of inert solid carrier. In any event a quantity of chemical is applied such as to produce a beneficial concentration in the quantity of soil treated.

Liquid compositions containing the desired amount of active ingredient may be prepared by dissolving the toxicants in an organic liquid carrier or by dispersing the toxicant in water with the aid of a suitable surface-active dispersing agent such as in ionic or non-ionic emulsifying agent, the latter also being used, if desired, when an organic solvent is employed. The surface-active dispersing agents are generally employed in the amount of from 1 to 20 percent by weight of the combined weight of the cyanofluoropyridine compound and surface-active agent in the composition. Suitable organic liquid carriers include acetone, xylene, toluene, isopropanol, polyglycols, chlorinated hydrocarbons such as methylene chloride, carbon tetrachloride and chlorobenzene and the petroleum distillates such as diesel fuel, kerosene, fuel oil, naphthas, and Stoddard solvent. Among the latter, the petroleum distillates boiling almost entirely under 400° F. at atmospheric pressure and having a flash point above 80° F. are generally preferred; however, any suitable liquid carrier or combination of carriers can be employed.

The aqueous compositions to be employed in the present method may contain a small amount of a water-immiscible solvent for the toxicant ingredient. In such composition, the carrier comprises an aqueous emulsion, namely, a mixture of water, emulsifying agent and organic liquid. The choice of dispersing and emulsifying agent and the amount thereof employed is dictated by the nature of the composition and by the ability of the agent to facilitate the dispersion of the toxicant compound in the aqueous carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the active ingredient is dispersed in and on a finely divided inert solid such as clay, talc, chalk, gypsum, pyrophyllite and the like. In such operations, and finely divided carrier is mechanically mixed or ground with the cyanofluoropyridine. Similarly, dust compositions containing the toxicant compounds may be prepared from various solid surface-active dispersing agents such as bentonite, fuller's earth, attapulgite and other clays. Depending upon the proportions of ingredients, these dust compositions may be employed as concentrates and subsequently diluted with additional solids, surface-active dispersing agents or with chalk, talc or gypsum and the like to obtain the desired amount of active ingredient in a composition adapted to be employed for the treatment of soil. Also, such dust compositions may be dispersed in water with or without the aid of a dispersing agent to form spray mixtures.

When operating in accordance with the present invention, the cyanofluoropyridine compound is dispersed in soil or growth media in any convenient fashion, e.g., by simply mixing with the soil, by applying to the surface of the soil and thereafter dragging or disking into the soil to the desired depth, by employing a liquid carrier to accomplish the penetration and impregnation, or by injection or drilling techniques whereby the toxicant is deposited beneath the surface of the soil. In a further method, the distribution of the cyanofluoropyridine compound in soil may be accomplished by dispersing the toxicants in the water employed to irrigate the soil. In such procedures, the amount of water may be varied with the porosity and water-holding capacity of the soil to obtain the desired depth of distribution of the toxicants.

It is a particular feature of this invention that once the toxicant has been introduced into the soil, it is not necessary to blanket the soil to suppress volatilization of the cyanofluoropyridine fumigant therefrom. Surprisingly, the volatility of the latter compounds is such as to permit of controlled diffusion thereof through the soil without suffering an unduly rapid loss of the fumigant to the atmosphere before the desired fungicidal action takes place. Moreover, when employed in the herein defined amounts, the toxicant compounds and compositions of the present invention have no undesirable seedicidal effect. Thus, seeding of the soil may take place as the fumigant composition hereof is applied, or at any reasonable time thereafter, e.g. within one or two months in most instances, with resultant improvements in the emergence and growth of seedlings and the crop harvest.

A preferred group of soil fungicidal fumigants is that which is made up of the cyanofluoropyridine compounds and compositions containing the same, as disclosed herein, wherein the cyano group is attached at the 2-position of the pyridine ring. The preferred compounds of the present invention may be represented by the formula:

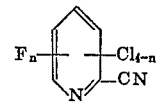

wherein $n$ is an integer of from 1 to 4 inclusive. Representative compounds falling within this preferred group include:

3,5,6-trichloro-4-fluoropicolinonitrile,
3,4,5-trichloro-6-fluoropicolinonitrile,
3,4,6-trichloro-5-fluoropicolinonitrile,
3,5-dichloro-4,6-difluoropicolinonitrile,
3-chloro-4,5,6-trifluoropicolinonitrile,
5-chloro-3,4,6-trifluoropicolinonitrile,
6-chloro-3,4,5-trifluoropicolinonitrile, and
tetrafluoropicolinonitrile A more preferred group of soil fungicidal fumigants is made up of those compounds enumerated in the foregoing paragraph which contain from two to four fluorine atoms in the molecule, these compounds having outstanding fungicidal activity as well as optimum vapor pressure, or volatility characteristics.

DESCRIPTION OF THE PREFERRED EMBODIMENTS

The following examples illustrate the invention but are not to be construed as limiting.

Example 1.—Tetrafluoropicolinonitrile

Tetrachloropicolinonitrile (150 grams; 0.621 mole) and potassium fluoride (361 grams; 6.21 moles) are reacted with stirring at 125° C. for 12¼ hours in the presence of 350 milliliters of dimethylformamide; about three-quarters of the potassium fluoride is added at the beginning of the heating period and the balance is added after three hours of reaction time. The buildup of products is followed by vapor phase chromatography analysis and the final product is found to contain 86 percent tetrafluoropicolinonitrile and 14 percent chlorotrifluoropicolinonitrile isomers. The reaction mixture on being cooled is filtered to remove salts, and the filtrate is diluted with water. The dimethylformamide-containing aqueous phase is extracted with dichloromethane and these extracts are combined with the water-insoluble crude phase. The resulting dichloromethane solution is concentrated by distillation and rewashed with water to remove any remaining dimethylformamide. The washed organic product phase is then dried with sodium sulfate and the solvent distilled off to give 90 grams of crude fluorinated product. (This separatory technique is that which is used in Examples 2 through 9 below.) The crude product is distilled at atmospheric pressure to give 62 grams of tetrafluoropicolinonitrile as the fraction boiling between 158 and 165° C. This product is characterized as a colorless liquid having carbon, nitrogen and fluorine contents of 40.12, 15.70 and 43.18 percent as compared with theoretical values of 40.92, 15.91 and 43.16 percent, respectively. It is slightly soluble in water and highly soluble in acetone and benzene. It has a vapor pressure of 1.46 mm. Hg at 25° C.

Example 2.—3-chloro-4,5,6-trifluoropicolinonitrile

Tetrachloropicolinonitrile (150 grams; 0.621 mole) and potassium fluoride (180 grams; 3.1 moles) are reacted with stirring in the presence of 180 milliliters of dimethylformamide. The reaction mixture is maintained at temperatures gradually rising from 50° to 80° C. for the first 7½ hours, then at approximately 100° C. for the next 4 hours, and finally at 125° C. for ½ hour; the product is then found to contain 20 percent of monochlorotrifluoropicolinonitrile isomers, 60 percent of dichlorodifluoropicolinonitrile and 13 percent of trichlorofluoropicolinonitrile isomers. Using the separatory method set forth in Example 1 there is obtained a crude product which is distilled under reduced pressure to recover a fraction boiling from 86–87° C. at 38 mm. Hg. This fraction is a colorless liquid which is slightly soluble in water and highly soluble in acetone and benzene. It has carbon, chlorine, nitrogen and fluorine contents of 37.24, 18.54, 14.58, and 29.47 percent as compared with theoretical values of 37.43, 18.42, 14.55 and 29.60 percent, respectively. Nuclear magnetic resonance analysis discloses it to be essentially 3-chloro-4,5,6-trifluoropicolinonitrile, with small percentages of the isomers 5-chloro-3,4,6-trifluoropicolinonitrile and 6-chloro-3,4,5-trifluoropicolinonitrile also being present.

Example 3.—3,5,6-trichloro-4-fluoropicolinonitrile

From the crude fluorinated product of Example 2 there is also distilled under reduced pressure a fraction boiling at 143° C. at 38 mm. Hg. This fraction is recrystallized from hexane to recover a white crystalline product having a melting point of 74.2–77.2° C. which is slightly soluble in water and highly soluble in acetone and benzene. The compound has a vapor pressure of $6.5 \times 10^{-3}$ mm. Hg at 25° C. It has carbon, chlorine, nitrogen and fluorine contents of 32.15, 47.41, 12.22 and 8.38 percent as compared with theoretical values of 31.96, 47.18, 12.43 and 8.43 percent, respectively. Nuclear magnetic resonance analysis discloses that this product is made up essentially of 3,5,6-trichloro-4-fluoropicolinonitrile with small amounts of the isomers 3,4,5-trichloro-6-fluoropicolinonitrile and 3,4,6-trichloro-5-fluoropicolinonitrile also being present.

Example 4.—3,5-dichloro-4,6-difluoropicolinonitrile

Tetrachloropicolinonitrile (50 grams; 0.207 mole) is reacted with potassium fluoride (60.2 grams; 1.035 moles) in the presence of 100 milliliters of dimethylformamide, the reaction mixture being maintained at 125° C. for 5⅓ hours. At the end of this period vapor phase chromatography discloses that the mixture contains 71 percent of dichlorodifluoropicolinonitrile, 28 percent of chlorotrifluoropicolinonitriles and less than 1 percent of trichlorofluoropicolinonitriles. The reaction mixture is worked up in the same fashion as described above in Example 1 and distilled under reduced pressure to recover 13.1 grams of a fraction boiling 100° C. at 38 mm. Hg. On being recrystallized from hexane, this product is recovered as a white crystalline material having a melting point of 61.8–66.5° C. which nuclear magnetic resonance analysis discloses to be essentially all 3,5-dichloro-4,6-difluoropicolinonitrile. It is slightly soluble in water, highly soluble in acetone and benzene, and has a vapor pressure of $3.8 \times 10^{-2}$ mm. Hg at 25° C. It has carbon, chlorine, nitrogen and fluorine contents of 34.2, 33.4, 13.0 and 19.4 percent as compared to theoretical values of 34.48, 33.93, 13.41 and 18.18 percent, respectively.

Example 5.—3,5-dichloro-2,6-difluoroisonicotinonitrile

Tetrachloroisonicotinonitrile (100 grams; 0.414 mole) and potassium fluoride (121 grams; 2.07 moles) are reacted together with stirring in the presence of 200 milliliters of dimethylsulfoxide, the reaction being conducted at 40–50° C. for 5 hours. The reaction mixture is worked up in the same fashion as described above in Example 1, following which the crude fluorinated product is distilled under reduced pressure to recover 30 grams of a fraction boiling at 109–113° C. at 38 mm. Hg. On being recrystallized from hexane, this product is recovered as a white crystalline material having a melting point of 76–78° C. which is slightly soluble in water and highly soluble in acetone and benzene. It has a vapor pressure of $8.4 \times 10^{-2}$ mm. Hg at 25° C. This product, which nuclear magnetic resonance discloses to be made up essentially of 3,5-dichloro-2,6-difluoroisonicotinonitrile together with a small percentage of the isomer 2,3-dichloro-5,6-difluoroisonicotinonitrile, is found to have carbon, chlorine, fluorine and nitrogen contents of 34.1, 33.6, 18.41 and 13.1 percent as compared with theoretical values of 34.48, 33.93, 18.18 and 13.41 percent, respectively.

Example 6.—2,3,5-trichloro-6-fluoroisonicotinonitrile

From the crude fluorinated product described above in Example 5 there is also distilled under reduced pressure approximately 12 grams of a fraction boiling at 142–144° C. at 38 mm. Hg. This fraction is recrystallized from hexane to recover a white crystalline product having a melting point of 84–87° C. which is slightly soluble in water and highly soluble in acetone and benzene. Nuclear magnetic resonance analysis discloses it to be made up of 2,3,5-trichloro-6-fluoroisonicotinonitrile together with a minor proportion of the isomer 2,3,6-trichloro-5-fluoroisonicotinonitrile. This product is found to have carbon, chlorine, nitrogen and fluorine contents of 32.22, 46.88, 12.51 and 7.56 percent as compared to theoretical values of 31.96, 47.18, 12.43 and 8.43 percent, respectively.

Example 7.—5-chloro-2,4,6-trifluoronicotinonitrile

Tetrachloronicotinonitrile (40 grams; 0.165 mole) and potassium fluoride (40 grams; 0.65 mole) are reacted together with stirring in the presence of 125 milliliters of acetonitrile, the reaction being conducted at 80° C. for 18 hours. This product is found to contain 8% of monochlorotrifluoronicotinonitriles, 40% of dichlorodifluoronicotinonitriles and 43% of trichloromonofluoronicotinonitriles. The reaction mixture is worked up in the manner described in Example 1, following which the crude fluorinated product is distilled under reduced pressure to recover 5-chloro-2,4,6-trifluoronicotinonitrile as the fraction boiling at 88° C. at 38 mm. Hg. This product is a colorless liquid which is slightly soluble in water and highly soluble in acetone and benzene. It has carbon, chlorine, nitrogen and fluorine contents of 36.05, 17.58, 14.28 and 29.77 percent as compared to theoretical values of 37.43, 18.42, 14.55 and 29.60 percent, respectively.

Example 8.—2,5 - dichloro - 4,6 - difluoronicotinonitrile; 4,5-dichloro - 2,6 - difluoronicotinonitrile; 5,6-dichloro-2,4-difluoronicotinonitrile From the crude fluorinated product of Example 7 there is also distilled off under reduced pressure a fraction boiling at 115° C. at 38 mm. Hg. This fraction is recrystallized from hexane to recover a product having the appearance of a white shiney wax. It has a melting point of approximately 22–25° C., is slightly soluble in water and highly soluble in acetone and benzene. The carbon chlorine, nitrogen and fluorine contents thereof are 34.2, 34.0, 13.4 and 18.07 percent as compared to theoretical values of 34.48, 33.93, 13.41 and 18.18 percent, respectively. Nuclear magnetic resonance analysis discloses that the product is made up of a mixture of the three isomers appearing in the caption of this example.

Example 9.—2,5,6-trichloro-4-fluoronicotinonitrile; 2,4,5-trichloro-6-fluoronicotinonitrile; 4,5,6 - trichloro-2-fluoronicotinonitrile From the crude fluorinated product of Example 7 there is further distilled off under reduced pressure a fraction boiling at 138–141° C. at 38 mm. Hg. This material is recrystallized from hexane to recover a white powdery product having a melting point of 70–73° C. It is slightly soluble in water and highly soluble in acetone and benzene. The carbon, chlorine, nitrogen and fluorine contents thereof are 32.46, 47.38, 12.41 and 7.92 percent as compared with theoretical values of 31.96, 47.18, 12.43 and 8.43 percent, respectively. Nuclear magnetic resonance analysis discloses that the product is made up of a mixture of the three isomers appearing in the caption of this example.

Example 10.—Tetrafluoronicotinonitrile

Tetrachloronicotinonitrile and potassium fluoride in the ratio of 10 moles of the fluoride to 1 mole of nitrile are placed in a sealed, nickel-lined Inconel bomb. This vessel is heated for a period of approximately 10 hours at 350°–400° C. From the reaction mixture so obtained there is distilled under reduced pressure a fraction boiling at 66° C. at 23 mm. Hg. This fraction, which is recovered in 40 to 45 percent yield, is a colorless liquid at ambient temperatures. It is slightly soluble in water and highly soluble in acetone and benzene. Vapor phase chromatography analysis discloses that the fraction is made up of 97 percent tetrafluoronicotinonitrile, 2 percent of monochlorotrifluoronicotinonitriles and 1 percent of lighter ends. Elemental analysis shows it to contain 41.0, 15.72 and 42.98 percent of carbon, nitrogen and fluorine, respectively, as compared with theoretical values of 40.92, 15.91 and 43.16 percent.

Example 11.—Tetrafluoroisonicotinonitrile

Tetrachloroisonicotinonitrile (30 grams; 0.124 mole) and potassium fluoride (72 grams; 1.24 moles) are placed in a sealing nickel-lined Inconel bomb and heated for 12 hours at 400° C. The product so obtained is treated with dichloromethane and the solution so obtained is separated from the remaining insoluble salts. The filtrate is heated to distill off the solvent, leaving a solid product which is taken up in hexane, norite-treated to remove color bodies and then recrystallized from solution. The white crystalline product so obtained in a yield of 48 percent, has a melting point of 65.5–66.5° C. It is slightly soluble in water and highly soluble in acetone and benzene. Vapor phase chromatography analysis discloses it to be made up of about 99.6 percent of tetrafluoroisonicotinonitrile. Elemental analysis shows it to contain 40.8, 16.1 and 43.1 percent of carbon, nitrogen and fluorine, respectively as compared with theoretical values of 40.92, 15.92 and 43.16 percent.

Example 12.—3-chloro-2,5,6-trifluoroisonicotinonitrile

Tetrachloroisonicotinonitrile and potassium fluoride in a nitrile/fluoride mole ratio of 1:10 are placed in a sealed, nickel-lined Inconel bomb and heated for 8 hours at 300° to 350° C. The product so obtained is treated with dichloromethane and the resulting solution is filtered to remove insoluble salts. The filtrate is heated to drive off solvent, leaving a crude fluorinated product which is subjected to repeated distillation under reduced pressure to finally recover a fraction boiling from 73° to 76° C. at 28 mm. Hg. This product, which has the appearance of a white crystalline material, has a melting point of about 25° C. It is slightly soluble in water and highly soluble in acetone and benzene. Vapor phase chromatography analysis discloses that it is made up of about 98 percent 3-chloro-2,5,6-trifluoroisonicotinonitrile.

Example 13

(a) In this operation concentrate compositions in the form of emulsifiable liquids are prepared by mechanically mixing together 70 parts by weight of xylene, 5 parts by weight of an alkylated aryl polyether alcohol (Triton X–100) and 25 parts of each of the cyanofluoropyridine toxicants described in the foregoing Examples 1 through 12.

(b) Water-dispersible concentrate compositions are prepared by mechanicaly mixing together 25 parts by weight of each of the cyanofluoropyridine toxicants as described above in Examples 1 through 12 with 5 parts by weight of Triton X–100.

(c) Concentrate compositions in the form of wettable powders are prepared by mechanically mixing together 25 parts by weight of each of the cyanofluoropyridine toxicants described in Examples 1 through 12, 70 parts by weight of fuller's earth, 3 parts by weight of an alkyl aryl sulfonate (Nacconal NR) and 2 parts by weight of a polymerized sodium salt of a substituted benzoid alkyl sulfonic acid (Daxad No. 27).

These compositions are adapted to be dispersed in water to prepare aqueous compositions which have very desirable penetrating and wetting properties. The latter aqueous compositions are adapted to be employed to distribute effective concentrations of the toxicant compounds on the seeds as well as in soil.

Example 14

In further operations, acetone solution containing a cyanofluoropyridine, as set forth below in Table 1, are employed for the treatment of sandy loam soil infested with a natural soil fungi population including *Rhizoctonia solani*. In such operations the fungus-infested soil is placed in sealable containers and the acetone solution of the toxicant is added to each sample in a concentration appropriate to provide the total soil sample in the container with an amount of either 2.5 or 10 parts by weight of toxicant per million parts by weight of soil. At the same time, checks are prepared by treating containers of the same infested soil with an amount of acetone equal to that employed in the corresponding test containers. The soil samples are then sealed and rolled to distribute the toxicant uniformly throughout the sample. After an incubation period of 3 days at 25° C., aliquot amounts of each soil sample are taken and diluted in sterile water blanks. Two drops of each of the resulting soil-water suspensions are then placed in a petri dish to which 10 milliliters of rose bengal agar are then added. The poured plates are incubated for 5 days at 25° C., following which they are examined and a count made of the total fungal colony population on each. The extent to which each toxicant effected control as compared with the checks, is shown in the following table.

TABLE I.—CONTROL OF FUNGAL COLONIES (PERCENT)

| | Toxicant | Toxicant conc., p.p.m. | |
|---|---|---|---|
| | | 10 | 2.5 |
| 1 | 3,5,6-trichloro-4-fluoropicolinonitrile | 94 | 86 |
| 2 | 3,5-dichloro-4,6-difluoropicolinonitrile | 98 | 86 |
| 3 | 3-chloro-4,5,6-trifluoropicolinonitrile | 97 | 93 |
| 4 | Tetrafluoropicolinonitrile | 92 | 72 |
| 5 | Check | 0 | |

Example 15

In this operation fungi-infected, sandy loam soil samples treated with toxicant, as well as checks, all prepared in the manner described above in Example 14 and containing 10, 2.5, 0.6 and 0.16 parts by weight of toxicant per million parts by weight of soil, are seeded with Panogen treated cotton seeds after the initial 3 day incubation period at 25° C. The samples are moistened and placed in a room maintained at 17° C. under conditions of high humidity for 10 days to allow the seeds to germinate. At the end of this time the resulting seedling plants are evaluated for the presence or absence of attack by *Rhizoctonia solani*. The extent to which the toxicant treated samples and the check survive attack is expressed in the following table.

TABLE II.—CONTROL OF *RHIZOCTONIA SOLANI* ATTACK ON COTTON SEEDLINGS (PERCENT SURVIVAL)

| | Toxicant | Toxicant concentrations (p.p.m.) | | | |
|---|---|---|---|---|---|
| | | 10 | 2.5 | 0.6 | 0.16 |
| 1 | 3,5,6-trichloro-4-fluoropicolinonitrile | 85 | 95 | 75 | 85 |
| 2 | 3,5-dichloro-4,6-difluoropicolinonitrile | 85 | 95 | 75 | 25 |
| 3 | 3-chloro-4,5,6-trifluoropicolinonitrile | 100 | 100 | 95 | 80 |
| 4 | Tetrafluoropicolinonitrile | 90 | 90 | 100 | 90 |
| 5 | Check | | 45 | | |

Example 16

The operations of Examples 14 and 15 are repeated, but with a different fungi-infected soil sample, and with other cyanofluoropyridine toxicants. The results obtained in these tests are given in the following table, it being noted that no cotton plants survived attack in the check sample of this test series.

TABLE III

| Toxicant concentration (p.p.m.) | Control of fungal colonies (percent) | | Control of *Rhizoctonia solani* attack on cotton seedlings (percent survival) | | | |
|---|---|---|---|---|---|---|
| | 10 | 2.5 | 10 | 2.5 | 0.6 | 0.16 |
| Toxicant: | | | | | | |
| (1) Trichlorofluoronicotinonitrile (isomer mixture of Example 9) | 75 | 41 | 80 | 40 | 50 | 60 |
| (2) Dichlorodifluoronicotinonitrile (isomer mixture of Example 8) | 61 | 46 | 100 | 80 | 100 | 60 |
| (3) 2,3,5-trichloro-6-fluoro-isonicotinonitrile | 85 | 27 | 90 | 40 | 50 | 0 |
| (4) 3,5-dichloro-2,6-difluoro-isonicotinonitrile | 80 | 32 | 90 | 40 | 40 | 10 |
| (5) Check | 0 | | 0 | | | |

Example 17

The emulsifiable liquid concentrate of Example 13(a) is dispersed in water to prepare a composition containing 14 pounds of tetrafluoropicolinonitrile per 200 gallons of ultimate mixture. The latter composition while under agitation is metered into irrigation water at the pump outlet at the rate of 4 gallons per 1000 gallons of the irrigation water. The water is in a state of turbulent flow as it comes from the pump, thus providing a thorough mixing of the toxicant composition therein. About 3 inches of the irrigation water is applied to a plot of sandy loam soil of good nutrient content which is heavily infested with Pythium spp., *Fusarium solani* and *Rhizoctonia solani*. The treatment accomplishes a wetting of the soil to a depth of about 2 feet to provide a concentration of about 2.5 parts by weight of the toxicant per million parts by weight of soil. A companion plot is treated in the same fashion, but without the presence of tetrafluoropicolinonitrile in the emulsifiable liquid concentrate employed, this plot serving as the check. Six weeks following the irrigation, both soil plots are seeded to lima beans. Four weeks after seeding the resulting stand of bean plants is examined. The plants from the plot treated with tetrafluoropicolinonitrile are found to be growing vigorously and substantially free of any evidence of fungal disease. The plants of the check plot are found to bear evidence of heavy fungal attack, many of the plants being stunted and badly diseased.

Example 18

In this operation a solution of tetrafluoropicolinonitrile in acetone is injected into sandy loam soil at a rate of 10 pounds of fungicide per acre foot of soil. The soil is one of good nutrient content which is infected with Verticillium, an organism causing vascular wilt of cotton. The acetone solution is injected at a level 6 inches deep in the soil in rows 12 inches apart using conventional soil fumigation equipment. The ground is allowed to stand fallow for 3 weeks, during which time the tetrafluoropicolinonitrile diffuses throughout the upper foot of the soil to provide an average concentration therein of 2.5 parts by weight of the toxicant per million parts by weight of soil. A similarly infected test plot of the same soil is treated in the same fashion except that the injected acetone is free of any content of fungicide. Both plots are then planted to cotton. The plants are examined near the end of the growing season at a time when the plants are maturing. Those plants from the untreated, check plot are found to be wilting despite heavy application of irrigation water, and examination of their cut stems reveals the presence of a brown-lesioned vascular system. In contrast, the plants in the plot treated with tetrafluoropicolinonitrile are observed to be lush, green and healthy. Their cut stems evidence a healthy, white vascular system.

The expressions "growth media" and "soil" are herein employed in their broadest sense to be inclusive of all conventional "soils" as defined in Webster's New International Dictionary, second edition, unabridged, published in 1937 by G. and C. Merriam Company, Springfield, Mass. Thus, the terms refer to any substance or media in which vegetation may take root and grow, and are intended to include not only earth but compost, manure, muck, humus, sand and the like, adapted to support plant growth.

The present invention has been particularly described as it relates to soil fumigation practices for the control of soil-dwelling fungi and bacteria. It should also be pointed out that the cyanofluoropyridine compounds hereof can also be used as space fumigants to control various molds, fungi and bacterial pests which are present on the walls therein. Thus, in the case of graneries or the like good pesticidal action is obtained as a liquid material containing the cyanofluoropyridine compound is sprayed or atomized into the atmosphere within the unit. In the case of of the storage vessels or on the surface of crops stored packed fruit, the said compounds can be applied to the inner walls of the carton or to the individual papers in which oranges, apples and other fruits are wrapped. The volatility of the present compounds is such that they provide a long-lasting protective atmosphere in the container and thus control fruit rot.

I claim:
1. Tetrafluoronicotinonitrile.
2. Tetrafluoropicolinonitrile.
3. 3-chloro-4,5,6-trifluoropicolinonitrile.
4. 3,5-dichloro-4,6-difluoropicolinonitrile.
5. 3,5,6-trichloro-4-fluoropicolinonitrile.

References Cited
UNITED STATES PATENTS
3,325,503  6/1967  Bimber  260—294.9

ALAN L. ROTMAN, Primary Examiner

U.S. Cl. X.R.
424—263